No. 810,213. PATENTED JAN. 16, 1906.
J. M. MYERS.
FARM GATE.
APPLICATION FILED AUG. 14, 1905.

2 SHEETS—SHEET 1.

ATTEST.
H. J. Fletcher.
W. P. Smith.

INVENTOR.
JACOB A. MYERS.
BY Rigdon & Longan,
ATT'YS.

No. 810,213. PATENTED JAN. 16, 1906.
J. M. MYERS.
FARM GATE.
APPLICATION FILED AUG. 14, 1905.
2 SHEETS—SHEET 2.
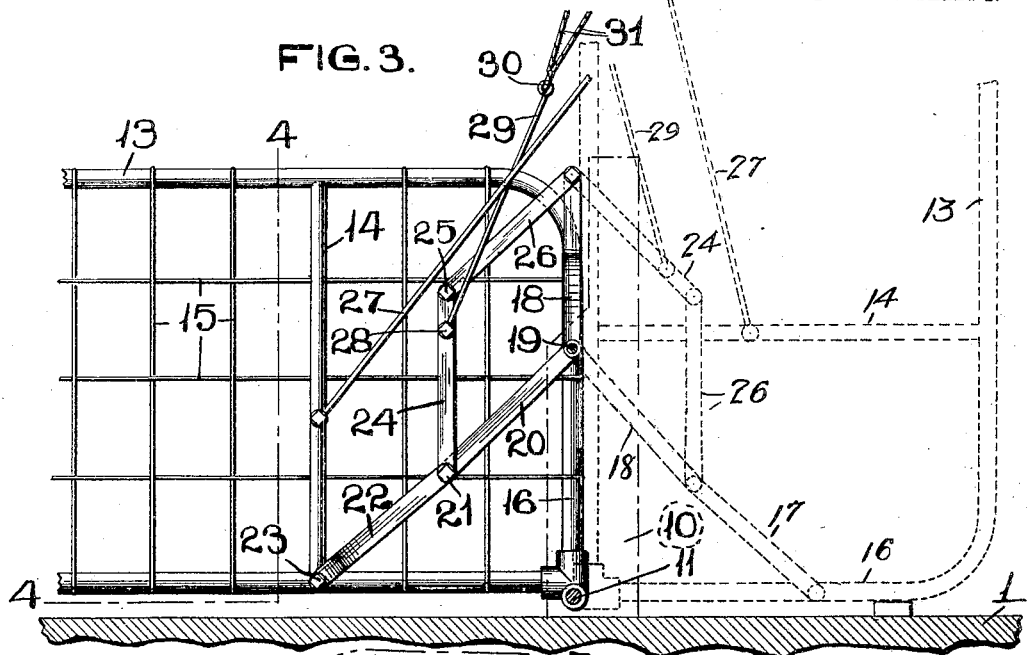
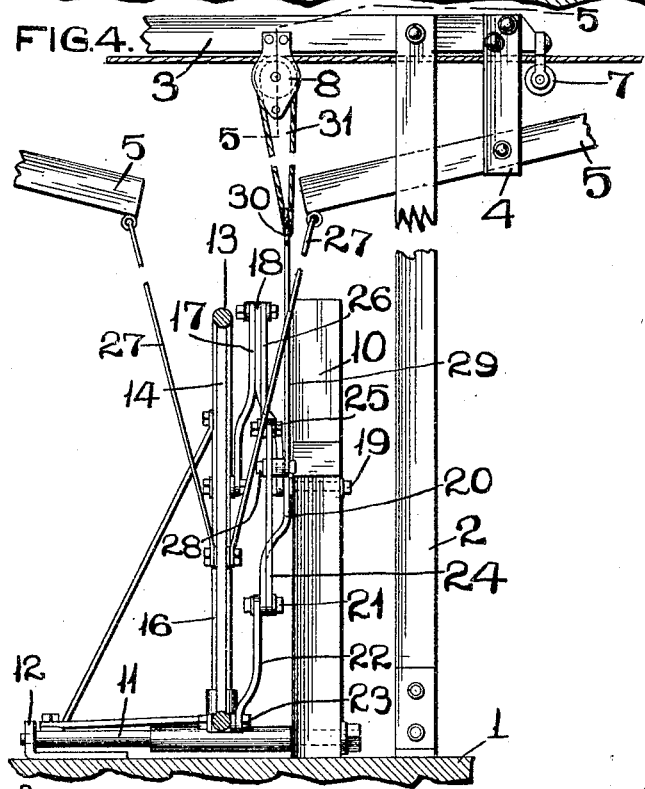
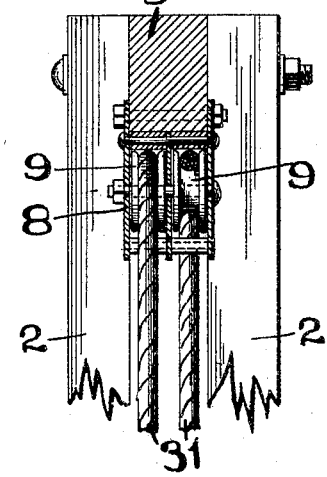
ATTEST.
H. G. Fletcher.
M. P. Smith.
INVENTOR.
JACOB A. MYERS.
BY Higdon & Longan,
ATTY'S.

UNITED STATES PATENT OFFICE.

JACOB A. MYERS, OF ST. LOUIS, MISSOURI.

FARM-GATE.

No. 810,213. Specification of Letters Patent. Patented Jan. 16, 1906.

Application filed August 14, 1905. Serial No. 274,177.

*To all whom it may concern:*

Be it known that I, JACOB A. MYERS, a citizen of the United States, and a resident of St. Louis, Missouri, have invented certain new and useful Improvements in Farm-Gates, of which the following is a specification, containing a full, clear, and exact description, reference being had to the accompanying drawings, forming a part hereof.

My invention relates to a farm-gate; and the object of my invention is to provide a gate with a system of levers whereby said gate is swung upwardly into an open position very easily and with little exertion.

My invention consists of certain novel features of construction and arrangement of parts, which will be hereinafter more clearly set forth, pointed out in my claims, and illustrated in the accompanying drawings, in which—

Figure 1:
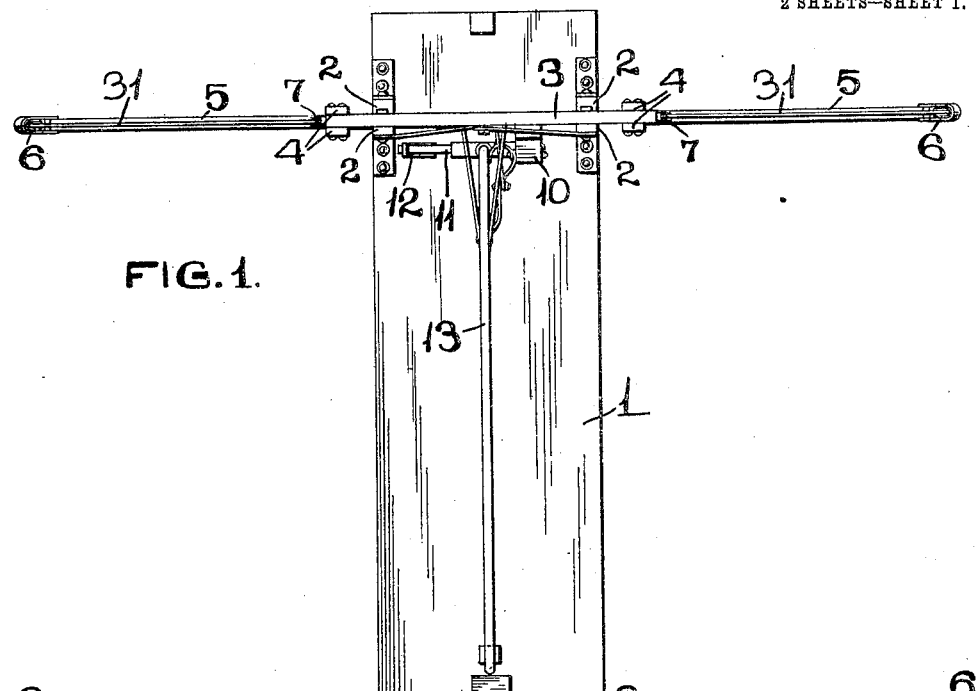
Figure 2:
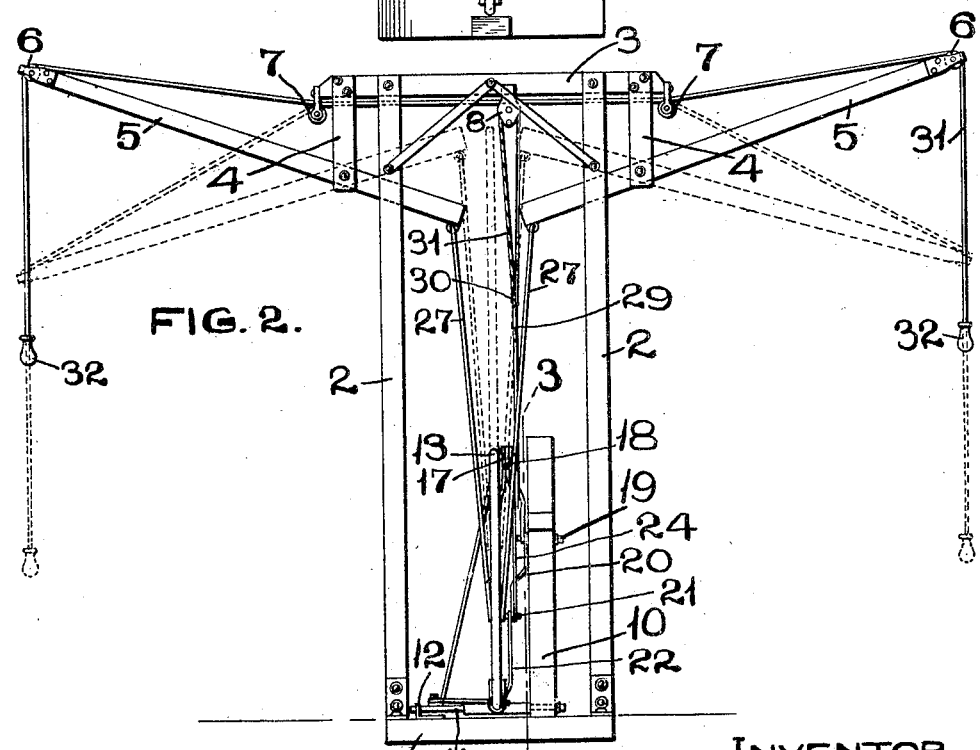

Figure 1 is a top plan view of a gate of my improved construction. Fig. 2 is a front elevation of the gate seen in Fig. 1. Fig. 3 is an enlarged vertical section taken on the line 3 3 of Fig. 2 and showing the pivoted end of the gate in normal position and dotted lines showing the gate in an open position. Fig. 4 is a vertical section taken on the line 4 4 of Fig. 3. Fig. 5 is an enlarged detail section taken on the line 5 5 of Fig. 4.

Referring by numerals to the accompanying drawings, 1 indicates the base of my improved gate, which is preferably a platform of timbers set into the ground, and at one end of said base are the vertically-arranged double posts 2, which are arranged opposite one another at the sides of the base 1. The upper ends of these pairs of posts 2 are framed together by a cross-bar 3, the ends of which project beyond the upper ends of the posts 2. Depending from each end of the cross-bar 3 is a pair of hangers 4, and pivotally arranged between the lower ends of these hangers are levers 5, which extend outwardly some distance from said hangers 4, and the outer ends of said levers are provided with the grooved pulleys 6. The inner ends of the levers 5 pass between the members of posts 2 and terminate a short distance from the center line between them. Secured to the extreme outer ends of the cross-bar 3 are the grooved pulleys 7, and arranged in a suitable hanger 8, immediately beneath the center of the cross-bar 3, is a pair of grooved pulleys 9. Rigidly fixed to the base 1 between the posts 2 and slightly to one side of the center line between said posts is a single post 10, which is approximately as high as is an ordinary fence-post, and journaled in the lower end of said post 10 is one end of a horizontal shaft 11, the opposite end of which is journaled in a bearing 12, which is adjacent the lower ends of one of the posts 2 and which is fixed to the base 1. Fixed to this shaft 11 a short distance from the post 10 is the lower rear corner of the rectangular gate-frame 13, which frame is provided with suitable cross-bars, such as 14, and wires, such as 15.

The rear bar 16 of the gate-frame occupies a vertical position parallel with the post 10 a short distance to one side thereof, and pivoted to the rear bar 16 at a point just above the center thereof is a vertically-extending link 17, the upper end of which terminates in approximately the same plane as that occupied by the top rail of the gate-frame 13. Pivotally secured to the upper end of this link 17 is the upper end of a similar link 18, that extends downwardly and is pivotally connected at its lower end to a bolt 19, that is fixed in the post 10 in alinement with the lower pivot-point of the link 17. Pivotally secured to this bolt 19 is the upper rear end of a link 20, that extends forwardly and downwardly from the post 10, its lower end being pivotally connected by means of a bolt 21 to the upper rear end of a similar link 22, the lower forward end of which is pivotally connected at 23 to the lower rail of the gate-frame 13. Pivotally connected to the bolt 21 is the lower end of a vertically-arranged link 24, the upper end of which is pivotally connected, by means of a bolt 25, to the lower rear end of a link 26, the upper end of which is pivotally connected to the upper ends of the links 17 and 18.

All of the links just described are approximately of uniform length and width, and the pivot-point 23 is the same distance away from the shaft 11 as is the bolt 19 and the pivot-point of the lower end of the link 17.

When the gate is closed, the bolt 21 occupies a position just past the center or below a line drawn through the pivot-point 23 and the bolt 19, and when the gate is open the pivot-point for the upper ends of the links 17, 18, and 26 occupies a similar position just below the center or below a line drawn through the pivot-point of the lower end of the link 17 and the pivot-point 23. This arrangement prevents the opening or closing of the gate unless the proper devices, hereinafter explained, are manipulated to operate the links and bring the specified pivot-points into positions above the center lines.

Secured to loops carried by the inner ends of the levers 5 are the upper ends of rods 27, the lower ends of which are pivotally connected to the cross-bar 14 of the gate-frame that is adjacent the rear bar 16. Pivotally connected to a bolt 28, that is fixed to the link 24 a short distance below the bolt 25, is the lower end of a short rod 29. Secured to a hook 30, that is formed integral with the upper end of this rod 29, are the lower ends of a pair of cords or cables 31, that extend upwardly over the grooved pulleys 9 in opposite directions and from thence outwardly over the grooved pulleys 7 and from thence to and around the grooved pulleys 6 and thence downwardly, and the lower ends of said cords or cables are provided with suitable handles 32.

The operation of my improved gate is as follows: The levers 5 extend outwardly from the gate a sufficient distance so that the handles 32 on the ends of the cords 31 may be engaged by a person seated in a vehicle and driving toward the gate. To open the gate, the handle 32 is engaged and the corresponding cord 31 is pulled downwardly. The first pull brings the bolt 21 of the levers 20 and 22 above the center, and then the pull is exerted on the outer end of the corresponding lever 5, the tendency of which is to pull said outer end downwardly, and at the same time the pull on the cord is transmitted by means of the rod 29 to the link 24 and from thence to the link 22, and as a result the gate-frame is pulled upwardly. The inner end of the lever 5, that is pulled downwardly, pulls upwardly on the corresponding one of the rods 27, and this pull is transmitted to the gate-frame, and as a result the gate is swung upwardly and rearwardly until it assumes a vertical position, as seen by dotted lines in Fig. 3, with the upper end of the rear bar 16 of said gate occupying a horizontal position and resting upon a suitable buffer located upon the base 1. As this opening movement of the gate takes place the various links 17, 18, 20, 22, 24, and 26 swing over to the opposite side of the post 10 and the ends of the links 17 and 18 that are pivoted together drop past the center, and as a result the gate is locked in its open position. When either one of the levers 5 is operated, the opposite lever is simultaneously moved, so that when one lever occupies an elevated or lowered position the opposite lever occupies a corresponding position. After the gate has been opened the person in the vehicle drives past said gate, and when the opposite handle 32 has been reached said handle is engaged and the corresponding cord or cable is pulled downwardly a short distance. The first result of this pull is to bring the levers 17 and 18 out of their locked positions, and then the leverage is applied to the gate by means of the pull of the levers transmitted to the cross-bar 14 by means of the rods 27, and as a result the gate is swung out of its vertical position and over past the vertical plane occupied by the posts 2, and then the gate will lower into a closed position by its own weight, during which movement the operator maintains his hold upon the handle 32 to prevent the gate from closing too fast. Thus the operator with a single pull practically unlocks the gate and then applies leverage thereto for closing it.

Its operation is very simple, and a gate of my improved construction can be readily closed or opened by a person in a vehicle, and when open the gate is swung into a position entirely to one side of the gate-post.

My improved gate can be operated with very little exertion, can be very cheaply manufactured, and possesses superior advantages in point of simplicity, durability, and general efficiency.

I claim—

1. In a farm-gate, a post, a gate hinged at its rear lower corner to said post, a double post on each side of the rear end of the gate, pivoted levers operating between said double posts, connections between the inner ends of the levers and the gate, locking-links pivotally secured to the first-mentioned post, and to the gate, and flexible connections from the outer ends of the levers to the locking-links; substantially as specified.

2. In a farm-gate, a post, a gate hinged at its rear lower corner to said post, a double post positioned on each side of the rear end of the gate, pivoted levers operating between said double posts, rods connecting the inner ends of said levers to the gate, two sets of locking-links pivotally held together and arranged between the first-mentioned post and the gate so as to hold said gate locked in either open or closed position, and cables extending from the outer ends of the levers to the locking-links; substantially as specified.

In testimony whereof I have signed my name to this specification in presence of two subscribing witnesses.

JACOB A. MYERS.

Witnesses:
  M. P. SMITH,
  E. L. WALLACE.